US011510135B2

(12) United States Patent
Shimojou et al.

(10) Patent No.: US 11,510,135 B2
(45) Date of Patent: Nov. 22, 2022

(54) NETWORK ACCESS METHOD AND COMMUNICATION SYSTEM

(71) Applicant: NTT DOCOMO, INC., Tokyo (JP)

(72) Inventors: Takuya Shimojou, Tokyo (JP); Srisakul Thakolsri, Munich (DE); Malla Reddy Sama, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/638,061

(22) PCT Filed: Jul. 11, 2018

(86) PCT No.: PCT/JP2018/026179
§ 371 (c)(1),
(2) Date: Feb. 10, 2020

(87) PCT Pub. No.: WO2019/035292
PCT Pub. Date: Feb. 21, 2019

(65) Prior Publication Data
US 2020/0178166 A1    Jun. 4, 2020

(30) Foreign Application Priority Data
Aug. 14, 2017   (JP) .............................. JP2017-156591

(51) Int. Cl.
*H04W 48/18*     (2009.01)
*H04W 4/029*     (2018.01)
(52) U.S. Cl.
CPC ........... *H04W 48/18* (2013.01); *H04W 4/029* (2018.02)

(58) Field of Classification Search
CPC .............................. H04W 48/18; H04W 4/029
See application file for complete search history.

(56) References Cited

U.S. PATENT DOCUMENTS

| 8,831,565    | B2 * | 9/2014  | Karaoguz  | H04W 48/08 |
|              |      |         |           | 455/411    |
| 2016/0353367 | A1 * | 12/2016 | Vrzic     | H04W 72/0433 |
| 2019/0104551 | A1 * | 4/2019  | Deenoo    | H04W 74/0833 |

(Continued)

OTHER PUBLICATIONS

Extended European Search Report issued in Application No. 18846159.4, dated Apr. 24, 2020 (10 pages).

(Continued)

*Primary Examiner* — Lester G Kincaid
*Assistant Examiner* — Dung L Lam
(74) *Attorney, Agent, or Firm* — Osha Bergman Watanabe & Burton LLP

(57) ABSTRACT

An object is that, in a mobile communication, a communication terminal that performs a non-cellular communication can access a service network that provides a service. A network access method to be performed by a communication system 8 forming a core network of the mobile communication and to cause a UE 7 performing the non-cellular communication to access a slice 5 providing the service comprises: an acquisition step of acquiring from the UE 7, terminal identification information identifying the UE 7; and an access step of referring to correspondence information correlating the UE 7 and the slice 5, and causing the UE 7 to access the slice 5 correlated with the UE 7 identified by the terminal identification information acquired in the acquisition step.

11 Claims, 15 Drawing Sheets

(56) References Cited

U.S. PATENT DOCUMENTS

2019/0261233 A1* 8/2019 Duan ............... H04W 36/14
2020/0015158 A1* 1/2020 So ............... H04W 48/18

OTHER PUBLICATIONS

SA WG2 Meeting #122; S2-174885; "5G Registration via Untrusted Non-3GPP Access;" Motorola Mobility, Lenovo, Nokia, Alcatel-Lucent Shanghai Bell, Broadcom, Brocade, Interdigital, ETRI, Rogers Wireless, Vodafone, ZTE; Jun. 26-30, 2017; San Jose Del Cabo, Mexico (12 pages).
SA WG2 Meeting #122; S2-174653; "TS 23.502: Clarification of NSSAI stored in the UE's subscription data;" NTT DOCOMO; Jun. 26-30, 2017; San Jose Del Cabo, Mexico (10 pages).
3GPP SA2#122; S2-174438; "Selecting a set of slices instances serving a UE;" Huawei Technologies; Jun. 2017; Los Cabos, Mexico (19 pages).
International Preliminary Report on Patentability for corresponding International Application No. PCT/JP2018/026179, dated Feb. 27, 2020 (9 pages).
Office Action issued in Japanese Application No. 2019-536441; dated Jul. 21, 2020 (10 pages).
International Search Report issued in PCT/JP2018/026179 dated Oct. 2, 2018 (1 page).
Written Opinion of the International Searching Authority issued in PCT/JP2018/026179 dated Oct. 2, 2018 (5 pages).
3GPP TS 23.501 V1.2.0; "3rd Generation Partnership Project; System Architecture for the 5G System"; Stage 2 (Release 15); Jul. 2017 (10 Pages).
SA WG2 Meeting #118; S2-166130 "Solution: Standalone non-3GPP access via NG2/NG3" Motorola Mobility, Lenovo, Broadcom, CMCC, Rogers; Kaohsiung City, Taiwan; Oct. 17-21, 2016 (13 pages).
Office Action issued in Japanese Application No. 2019-536441; dated Jan. 19, 2021 (10 pages).
Office Action issued in Indian Application No. 202037003791, dated Mar. 24, 2021 (6 pages).
SA WG2 Meeting #119; S2-171027 "Proposed architecture alignments of Network Slicing Conclusion with 5G Core Overall Architecture in TS 23.501" ZTE, Oracle, ETRI, Telecom Italia, KDDI; Dubrovnik, Croatia; Feb. 13-17, 2017 (9 pages).
Office Action issued in Chinese Application No. 201880047420.1; dated May 8, 2021 (19 pages).
Office Action issued in Chinese Application No. 201880047420.1 dated Oct. 21, 2021 (14 pages).
Office Action issued in European Application No. 18846159.4 dated Oct. 5, 2021 (5 pages).

* cited by examiner

Fig.3

| Subscribed NSSAI | | AMF |
|---|---|---|
| SST | SD | |
| SST1, SST3 | SD1, SD3 | AMF1 |
| SST2 | SD2 | AMF2 |
| SST4 | SD4 | AMF3 |

| UE | Subscribed NSSAI | | DNN | Allowed NSSAI | |
|---|---|---|---|---|---|
| | SST | SD | | SST | SD (OPTION) |
| AAA | SST1, SST3 | SD1, SD3 | DNN1, DNN3 | SST1, SST3 | SD1, SD3 |
| BBB | SST2 | SD2 | DNN2 | SST2 | SD2 |
| CCC | SST4 | SD4 | DNN4 | SST4 | SD4 |

(b)

| AMF | Supported SST | Supported SD | DNN |
|---|---|---|---|
| AMF1 | SST1, SST3 | SD1, SD3 | DNN1, DNN3 |

Fig.7

| UE | Subscribed NSSAI | | DNN |
|---|---|---|---|
| | SST | SD (OPTION) | |
| AAA | SST1, SST3 | SD1, SD3 | DNN1, DNN3 |
| BBB | SST2 | SD2 | DNN2 |
| CCC | SST4 | SD4 | DNN4 |

*Fig. 9*

| POSITION | AMF | Subscribed NSSAI | | Allowed NSSAI | | NSI-ID (OPTION) |
|---|---|---|---|---|---|---|
| | | SST | SD | SST | SD (OPTION) | |
| Area1 | AMF1 | SST1 | SD1 | SST1 | SD1 | NSI_A |
| | AMF1 | SST1 | SD1 | SST1 | SD1 | NSI_B |
| | AMF2 | SST2 | SD2 | SST2 | SD2 | NSI_C |
| | AMF1 | SST3 | SD3 | SST3 | SD3 | NSI_D |
| Area2 | AMF3 | | | | | |

NETWORK ACCESS METHOD AND COMMUNICATION SYSTEM

TECHNICAL FIELD

It relates to a network access method to be performed by a communication system forming a core network of a mobile communication and to cause a communication terminal performing a non-cellular communication to access a service network providing a service.

BACKGROUND ART

A Non Patent Literature 1 to be described below discloses architecture regarding a 5GC (5G Core Network) corresponding to a core network of a fifth generation mobile communication system (5th Generation).

CITATION LIST

Non Patent Literature

Non Patent Literature 1: 3GPP TS 23.501 V1.2.0 (2017-07)

SUMMARY OF INVENTION

Technical Problem

Access assumed in the above 5GC from a UE (User Equipment) to a slice (Network Slice) corresponding to a logical network that provides a predetermined service is performed on the premise that an access method of 5G is used. Thus, there is a problem that the UE performing a non-cellular communication that is not the access method of 5G cannot access the slice that is managed by the 5GC.

Thus, to solve the above problem, an object is to provide a network access method in which a communication terminal that performs a non-cellular communication can access a service network that provides a service in a mobile communication.

Solution to Problem

To solve the above problem, a network access method according to one aspect of the present invention is a network access method to be performed by a communication system forming a core network of a mobile communication and to cause a communication terminal performing a non-cellular communication to access a service network providing a service, the network access method comprising: an acquisition step of acquiring from the communication terminal, terminal identification information identifying the communication terminal; and an access step of referring to correspondence information correlating the communication terminal and the service network, and causing the communication terminal to access the service network correlated with the communication terminal identified by the terminal identification information acquired in the acquisition step.

By the network access method as described above, in the mobile communication, the terminal identification information that identifies the communication terminal is acquired from the communication terminal that performs the non-cellular communication, the correspondence information correlating the communication terminal that performs the non-cellular communication and the service network that provides the service is referred to, and the communication terminal that performs the non-cellular communication is caused to access the service network that is correlated with the communication terminal that performs the non-cellular communication identified by the acquired terminal identification information. That is to say, in the mobile communication, the communication terminal that performs the non-cellular communication can access the service network that provides the service.

Advantageous Effects of Invention

In the mobile communication, the communication terminal that performs the non-cellular communication can access the service network that provides the service.

BRIEF DESCRIPTION OF DRAWINGS

FIG. 3 is a diagram that shows an example of a table of AMF information.

FIG. 5 is a diagram that shows an example of a table of slice information.

FIG. 7 is a diagram that shows an example of a table of terminal slice information.

FIG. 9 is a diagram that shows an example of a table of position slice information.

DESCRIPTION OF EMBODIMENTS

Figure 1:
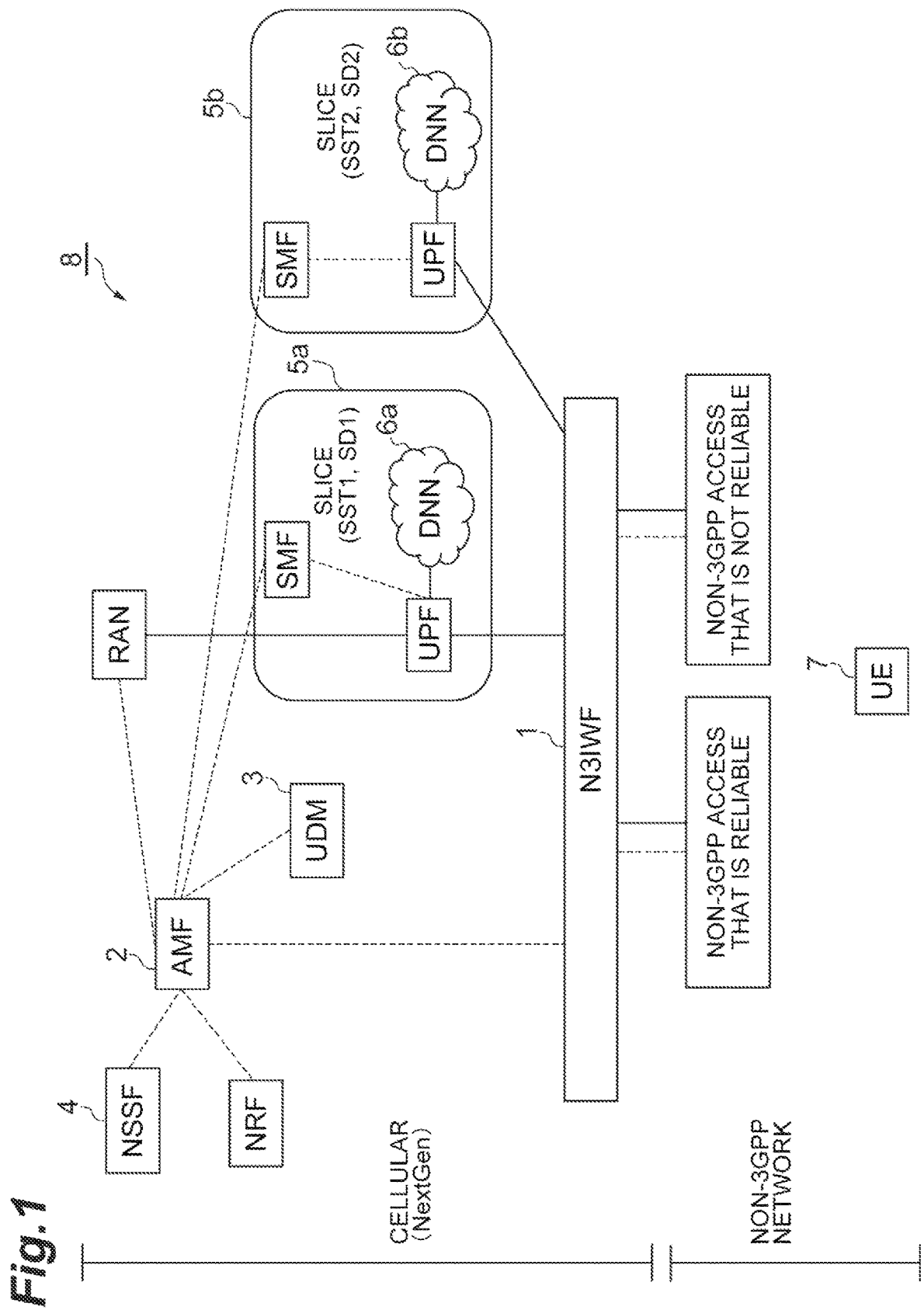
FIG. 1 is a system structure diagram of a communication system according to an embodiment of the present invention.

An embodiment of a network access method and a communication system will be hereinafter described in detail with reference to the drawings. Note that in description of the drawings, the same component is donated by the same reference character, and redundant description is omitted. The embodiment to be described below is a specific example of the present invention. The present invention is not limited to these embodiments unless there is description of limiting the present invention in particular.

FIG. 1 is a system structure diagram of a communication system 8 according to the embodiment of the present invention. The communication system 8 forms a 5GC corresponding to a core network of a mobile communication (cellular, NextGen), and causes a UE 7 corresponding to a communication terminal that performs a non-cellular communication (Wi-Fi (registered trademark) communication, for example) in a non-3GPP (3rd Generation Partnership Project) network to access a slice 5 corresponding to a service network that provides a service.

As illustrated in FIG. 1, the communication system 8 includes an N3IWF (Non-3GPP Interworking Function) 1, an AMF (Access and Mobility Management Function) 2, a UDM (Unified Data Management) 3, an NSSF (Network Slice Selection Function) 4, a RAN (Radio Access Network), an NRF (NF (Network Function) Repository Function), and the slice 5 (general term including slice 5a and slice 5b). The slice 5 includes a DNN (Data Network Name) 6 (general term including DNN 6a and DNN 6b), a UPF (User Plane Function), and an SMF (Session Management Function).

The N3IWF 1, the AMF 2, the UDM 3, the NSSF 4, the slice 5, the DNN, the UPF, and the SMF, and the UE 7, an SST (Slice/Service Type), an SD (Slice Differentiator), an NSSI (Network Slice Selection Assistance Information), an S-NSSAI (Single NSSI), a Subscribed NSSAI, an Allowed NSSAI, an NSI-ID (Network Slice Instance ID), an AUSF (Authentication Server Function), an NAS (Non-Access-Stratum), and the like to be described below are equivalent to or extension of a function, a node, information, a concept, or the like expressed by the same term that is disclosed in the above Non Patent Literature 1. Description regarding the content (including architecture of 5GC and the like) disclosed in the above Non Patent Literature 1 is omitted appropriately. Note that the above function is implemented by one or more predetermined computer devices, and the above node is formed by one or more predetermined computer devices.

The slice 5 is a virtual network or a service network that is generated logically in a network infrastructure by virtually dividing resources corresponding to a link and the node of a network device and coupling the divided resources. The slices 5 include the resources separately, and mutual interference does not occur.

In a similar way, the UE 7 illustrated in FIG. 1 is the communication terminal that performs the non-cellular communication. The UE 7 performs a non-3GPP access that is reliable and the non-3GPP access that is not reliable for the N3IWF 1 included in the communication system 8.

Figure 2:
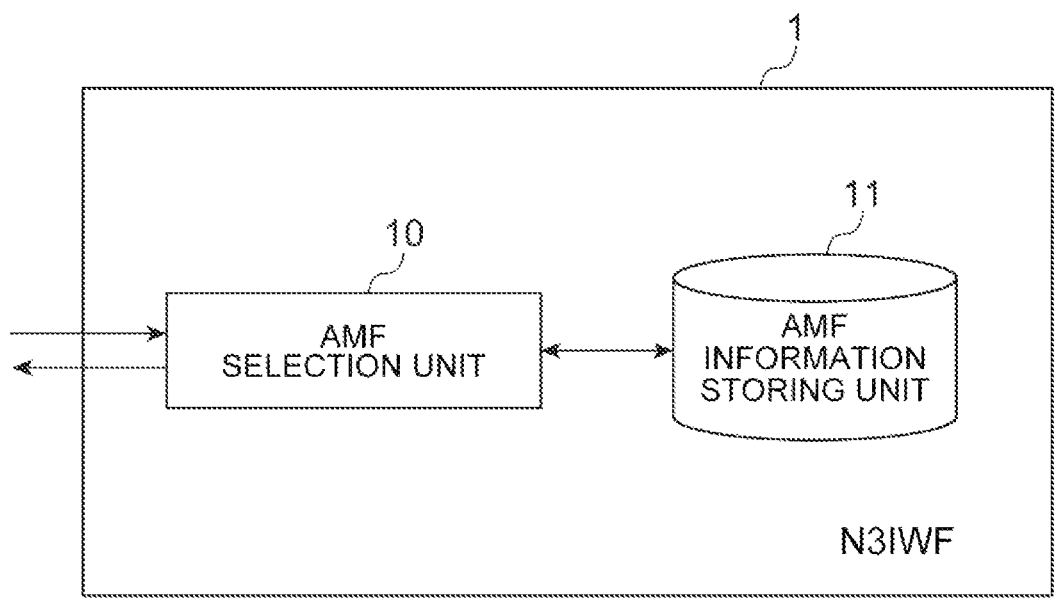
FIG. 2 is a function block diagram of an N3IWF.

FIG. 2 is a function block diagram of the N3IWF 1. As illustrated in FIG. 2, the N3IWF 1 includes an AMF selection unit 10 and an AMF information storing unit 11.

The AMF selection unit 10 acquires from the UE 7, an access request including network identification information that identifies the slice 5 that the UE 7 requests to access and terminal identification information that identifies the UE 7 through the non-3GPP access that is reliable or the non-3GPP access that is not reliable, selects the AMF 2 that manages the slice 5 identified by the network identification information included in the acquired access request, and transfers (redirects) the acquired access request to the selected AMF 2. More specifically, the AMF selection unit 10 refers to AMF information stored in the AMF information storing unit 11, and selects the AMF 2 correlated with the slice 5 that is identified by the network identification information included in the acquired access request in the AMF information. The AMF information is information correlating the slice 5 and the AMF 2 that manages the slice 5.

Moreover, the AMF selection unit 10 transmits to the UE 7, a message including the Allowed NSSAI that is transmitted from the AMF 2 as a response to the transfer of the access request to the AMF 2.

The AMF information storing unit 11 stores the AMF information. FIG. 3 is a diagram showing an example of a table of the AMF information stored in the AMF information storing unit 11. As shown in FIG. 3, in the example of the table of the AMY information, the Subscribed NSSAI that identifies the slice 5 and the AMF identification information that identifies the AMF that manages the slice 5 are correlated with each other. The Subscribed NSSAI includes the SST that identifies a service type of the service that the slice 5 provides, and the SD that distinguishes the slice 5. Note that the SD is optional and the Subscribed NSSAI does not need to include the SD. A pair of the SST and the SD or the SST alone is called S-NSSAI.

For example, if the AMF selection unit 10 acquires the access request including the network identification information "SST2" and "SD2" from the UE 7, the AMF selection unit 10 refers to the example of the table of the AMF information shown in FIG. 3, extracts the AMF identification information "AMF2" correlated with the network identification information "SST2" and "SD2", and transfers the acquired access request to the AMF2 identified by the extracted AMF identification information "AMF2". Note that an address of the AMF 2 corresponding to a transfer destination is acquired on the basis of information in which the AMF identification information and the address of the AMF 2 expressed by the AMF identification information are correlated with each other that is stored in advance in the N3IWF 1 or a different node or function included in the communication system 8. In the present embodiment, the address of each node or each function is similarly acquired.

The access request acquired by the AMF selection unit 10 from the UE 7 does not need to include the network identification information. In this case, the AMF selection unit 10 transfers to the default AMF 2 on the basis of position information of the UE 7 or the like. In addition, if there is not the AMF identification information that is correlated with the network identification information included in the access request in the AMF information, the AMF selection unit 10 transfers to the default AMF 2 on the basis of the position information of the UE 7 or the like. Note that the position information of the UE 7 may be acquired from the UE 7, or may be acquired by inquiry to the different node or function included in the communication system 8 on the basis of the terminal identification information included in the access request. The node or function included in the communication system 8 other than the N3IWF 1 similarly acquires the position information of the UE 7.

Figure 4:
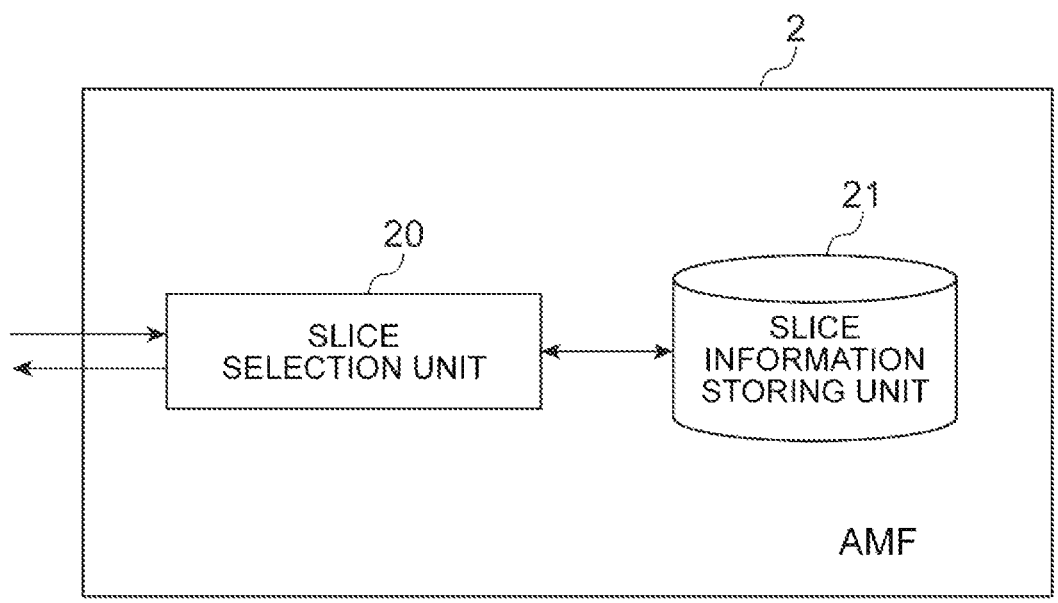
FIG. 4 is a function block diagram of an AMF.

FIG. 4 is a block diagram of the AMF 2. As illustrated in FIG. 4, the AMF 2 includes a slice selection unit 20 and a slice information storing unit 21. The AMF 2 is a mobility management function that manages mobility in the mobile communication in the communication system 8.

The slice selection unit 20 acquires the access request from the UE 7 through the N3IWF 1, refers to correspondence information that correlates the UE 7 and the slice 5, and transmits to the UE 7, information regarding the slice 5 that is correlated with the UE 7 identified by the terminal identification information included in the acquired access request; and thus, the slice selection unit 20 causes the UE 7 to access the slice 5. More specifically, the slice selection unit 20 refers to terminal slice information (correspondence information) correlating the UE 7 and the slice 5 that the UE 7 can use, and transmits to the UE 7, the information regarding the slice 5 that the UE 7 can use that is correlated with the UE 7 identified by the terminal identification information included in the acquired access request; and thus, the slice selection unit 20 causes the UE 7 to access the slice 5. Moreover, the slice selection unit 20 refers to position slice information (correspondence information) correlating the UE 7 and the slice 5 that the UE 7 can use on the basis of the current position, and transmits to the UE 7, the information regarding the slice 5 that the UE 7 can use on the basis of the current position that is correlated with the UE 7 identified by the terminal identification information included in the acquired access request; and thus, the slice selection unit 20 causes the UE 7 to access the slice 5. Furthermore, the slice selection unit 20 transmits to the UE 7, the information regarding the slice 5 further based on the slice 5 identified by the network identification information that is included in the acquired access request; and thus, the slice selection unit 20 causes the UE 7 to access the slice 5. Description will be made below specifically.

If the slice selection unit 20 acquires the access request from the UE 7 through the N3IWF 1, the slice selection unit 20 transmits to the UDM 3, a slice selection data request that includes the terminal identification information included in the acquired access request. Although description will be made below, the terminal slice information is referred to in the UDM 3, and the slice selection unit 20 receives a slice selection data response including the Subscribed NSSAI that identifies the slice 5 that the UE 7 can use as a response to the slice selection data request.

Next, the slice selection unit 20 acquires the position information of the UE 7 on the basis of the terminal identification information included in the acquired access request. Next, the slice selection unit 20 transmits to the NSSF 4, a slice selection request that includes the network identification information included in the acquired access request, the Subscribed NSSAI included in the received slice selection data response, and the acquired position information of the HE 7. As will be described below, the position slice information is referred to in the NSSF 4, and the slice selection unit 20 receives a slice selection response that includes the Allowed NSSAI identifying the slice 5 that the UE 7 can use on the basis of the current position and the AMF identification information identifying the AMF 2 that manages the slice 5, as a response to the slice selection request.

Next, the slice selection unit 20 judges whether the AMF 2 that is identified by the AMF identification information included in the slice selection response is an own function (AMF 2). If the AMF 2 is judged as the own function, the slice selection unit 20 calls the AUSF and performs an authentication of the UE 7 and an NAS security setting. Next, the slice selection unit 20 transmits to the UE 7 through the N3IWF 1, a message that includes the Allowed NSSAI included in the slice selection response, as a response to the access request from the UE 7. Note that in the above judgement, if the AMF 2 is not judged as the own function, the slice selection unit 20 inquires of the NRF the address of the AMF 2 identified by the AMF identification information included in the slice selection response, redirects the Allowed NSSAI included in the slice selection response together to the AMF 2 (different from own function) that is acquired from the inquiry result, and, in the AMF 2 corresponding to a redirect destination, the execution of the authentication of the UE 7 and the NAS security setting and the transmission of a message including the Allowed NSSAI to the UE 7 that are described above are performed.

The slice information storing unit 21 stores the slice information regarding the slice 5. FIG. 5(a) is an example of a table of the slice information that is acquired by the communication between the slice selection unit 20, and the UDM 3 and the NSSF 4. In the example of the table of the slice information shown in FIG. 5(a), the terminal identification information that identifies the UE 7, the Subscribed NSSAI that identifies the slice 5 that the UE 7 can use, DNN identification information that identifies the DNN 6 that forms the slice 5, and the Allowed NSSAI that identifies the slice 5 that the UE 7 can use on the basis of the current position of the UE 7 are correlated with each other. Each of the Subscribed NSSAI and the Allowed NSSAI includes the SST and the SD. Note that the SD of the Allowed NSSAI is optional and the Allowed NSSAI does not need to include the SD. In the example of the table of the slice information shown in FIG. 5(a), for example, by the communication with the UDM 3, the correlation among the terminal identification information, the Subscribed NSSAI, and the DNN identification information is updated by the slice selection unit 20, and by the communication with the NSSF 4, the correlation with the Allowed NSSAI is updated by the slice selection unit 20.

On the other hand, FIG. 5(b) is an example of a table of the slice information regarding the slice 5 supported by the AMF 2. In the example of the table of the slice information shown in FIG. 5(b), the AMF identification information corresponding to the identification information of the AMF 2, the SST (supported SST) and the SD (supported SD) that identify the slice 5 supported (managed) by the AMF 2, the DNN identification information that identifies the DNN 6 that foul's the slice 5 are correlated with each other. The AMF 2 refers to the above slice information and judges whether the own function supports the slice 5 that the UE 7 is caused to access. If the AMF 2 judges that the own function does not support the slice 5, the AMF 2 looks up a different AMF 2 and redirects to the different AMF 2 appropriately.

Figure 6:
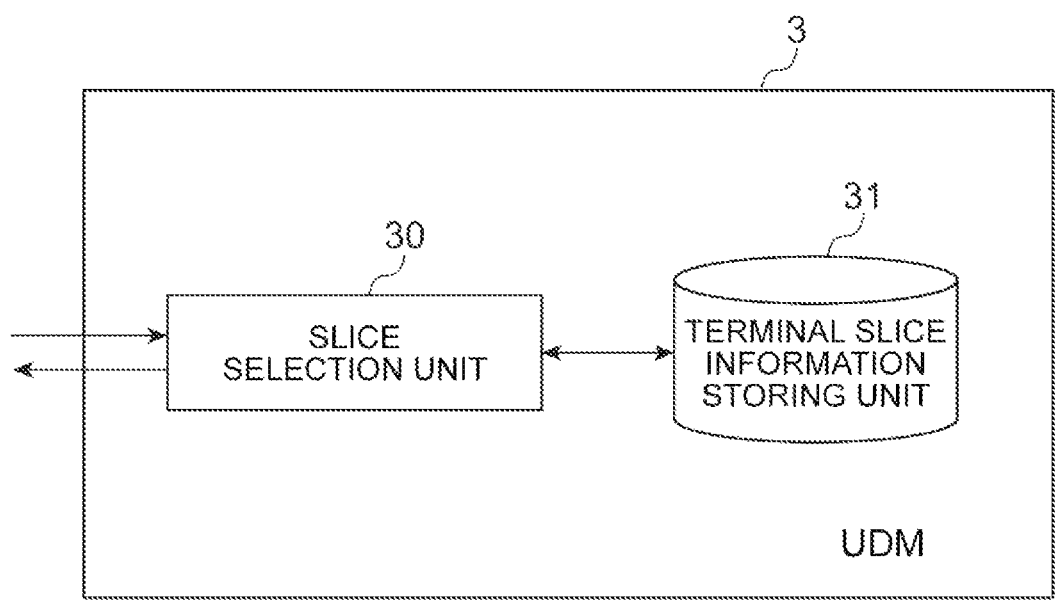
FIG. 6 is a function block diagram of a UDM.

FIG. 6 is a function block diagram of the UDM 3. As illustrated in FIG. 6, the UDM 3 includes a slice selection unit 30 and a terminal slice information storing unit 31.

If the slice selection unit 30 receives the slice selection data request from the AMF 2, the slice selection unit 30 refers to the terminal slice information stored in the terminal slice information storing unit 31, extracts the Subscribed NSSAI that identifies the slice 5 that the UE 7 identified by the terminal identification information included in the slice selection data request can use, and transmits to the AMF 2, the slice selection data response including the extracted Subscribed NSSAI.

The terminal slice information storing unit 31 stores the terminal slice information. FIG. 7 is a diagram that shows an example of a table of the terminal slice information. As shown in FIG. 7, in the example of the table of the terminal slice information, the terminal identification information that identifies the UE 7, the Subscribed NSSAI that identifies the slice 5 that the UE 7 can use, and the DNN identification information that identifies the DNN 6 that forms the slice 5 are correlated with each other. The Subscribed NSSAI includes the SST and the SD.

For example, if the slice selection unit 30 receives the slice selection data request including the terminal identification information "BBB" from the AMF 2, the slice selection unit 30 refers to the example of the table of the terminal slice information shown in FIG. 7, extracts the SST "SST2" and the SD "SD2" of the Subscribed NSSAI correlated with the terminal identification information "BBB", and transmits to the AMF 2, the slice selection data response including the extracted Subscribed NSSAI.

Figure 8:
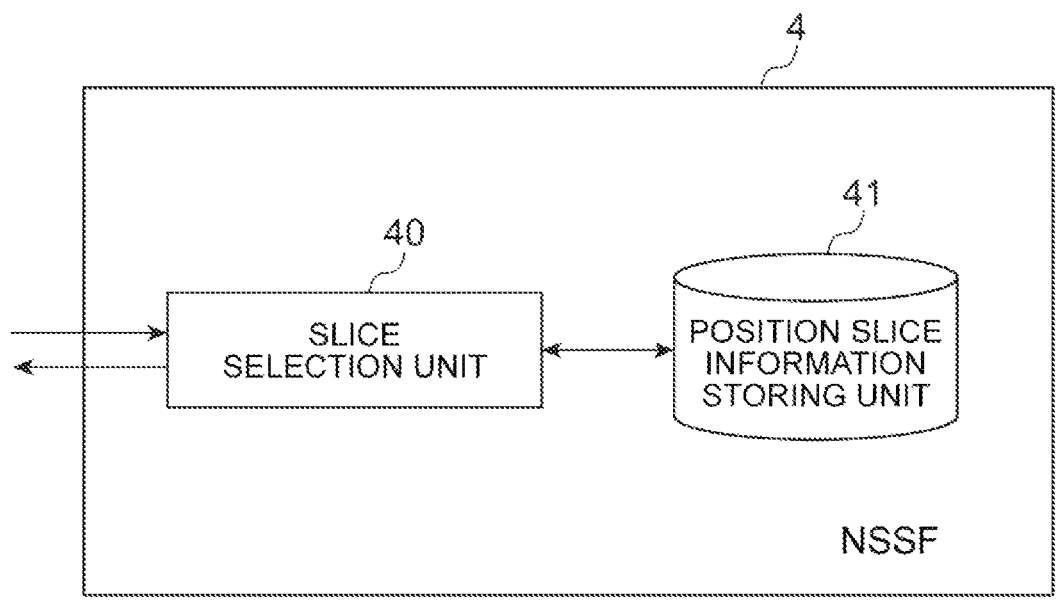
FIG. 8 is a function block diagram of an NSSF.

FIG. 8 is a function block diagram of the NSSF 4. As illustrated in FIG. 8, the NSSF 4 includes a slice selection unit 40 and a position slice information storing unit 41. Note that it is assumed that the NSSF 4 grasps the topology of each slice 5, configuration nodes of the slice 5, and a management range of the AMF 2.

If the slice selection unit 40 receives the slice selection request from AMF 2, the slice selection unit 40 refers to the position slice information that is stored in the position slice information storing unit 41, and transmits to the AMF 2, the slice selection response including the Allowed NSSAI that identifies the slice 5 that the UE 7 identified by the terminal identification information included in the slice selection request can use on the basis of the current position, and the AMF identification information that identifies the AMF 2 managing the slice 5. Note that the slice selection unit 40 may extract the Allowed NSSAI further based on the slice 5 identified by the network identification information included in the slice selection request. For example, the slice selection unit 40 extracts as the Allowed NSSAI, the slice 5 identified by the network identification information included in the slice selection request among the slices 5 that the UE 7 identified by the terminal identification information included in the slice selection request can use on the basis of the current position.

The position slice information storing unit 41 stores the position slice information. FIG. 9 is a diagram that shows an example of a table of the position slice information. As shown in FIG. 9, in the example of the table of the position slice information, the position information (for example, information that expresses an area corresponding to a predetermined communication range in the mobile communication), the AMF identification information that identifies the AMF 2 managing the slice 5 in the position expressed by the position information, the Subscribed NSSAI that is included in the slice 5 managed by the AMF 2 in the position expressed by the position information, the Allowed NSSAI that is included in the slice 5 managed by the AMF 2 that can be used in the position expressed by the position information, and the NSI-ID (option) that identifies an instance of the slice 5 identified by the Allowed NSSAI are correlated with each other. Each of the Subscribed NSSAI and the Allowed NSSAI includes the SST and the SD. Note that the SD of the Allowed NSSAI is optional and the Allowed NSSAI does not need to include the SD. Moreover, the Allowed NSSAI may be a subset of the Subscribed NSSAI. That is to say, a set of the slices 5 that the UE 7 can use on the basis of the current position may be the subset of the slices 5 that the UE 7 can use. Information such as a name of the node to be accessed is con-elated with the NSI-ID.

For example, if the slice selection unit 40 receives the slice selection request that includes the position information "Area1" of the UE 7 and the SST "SST2" and the SD "SD2" of the Subscribed NSSAI from the AMF 2, the slice selection unit 40 refers to the example of the table of the position slice information shown in FIG. 9, extracts the SST "SST2" and the SD "SD2" of the Allowed NSSAI and the AMF identification information "AMF2" that are correlated with the position information "Area1" and the SST "SST2" and the SD "SD2" of the Subscribed NSSAI, and transmits to the AMF 2, the slice selection response that includes the extracted Allowed NSSAI and AMF identification information.

Figure 10:
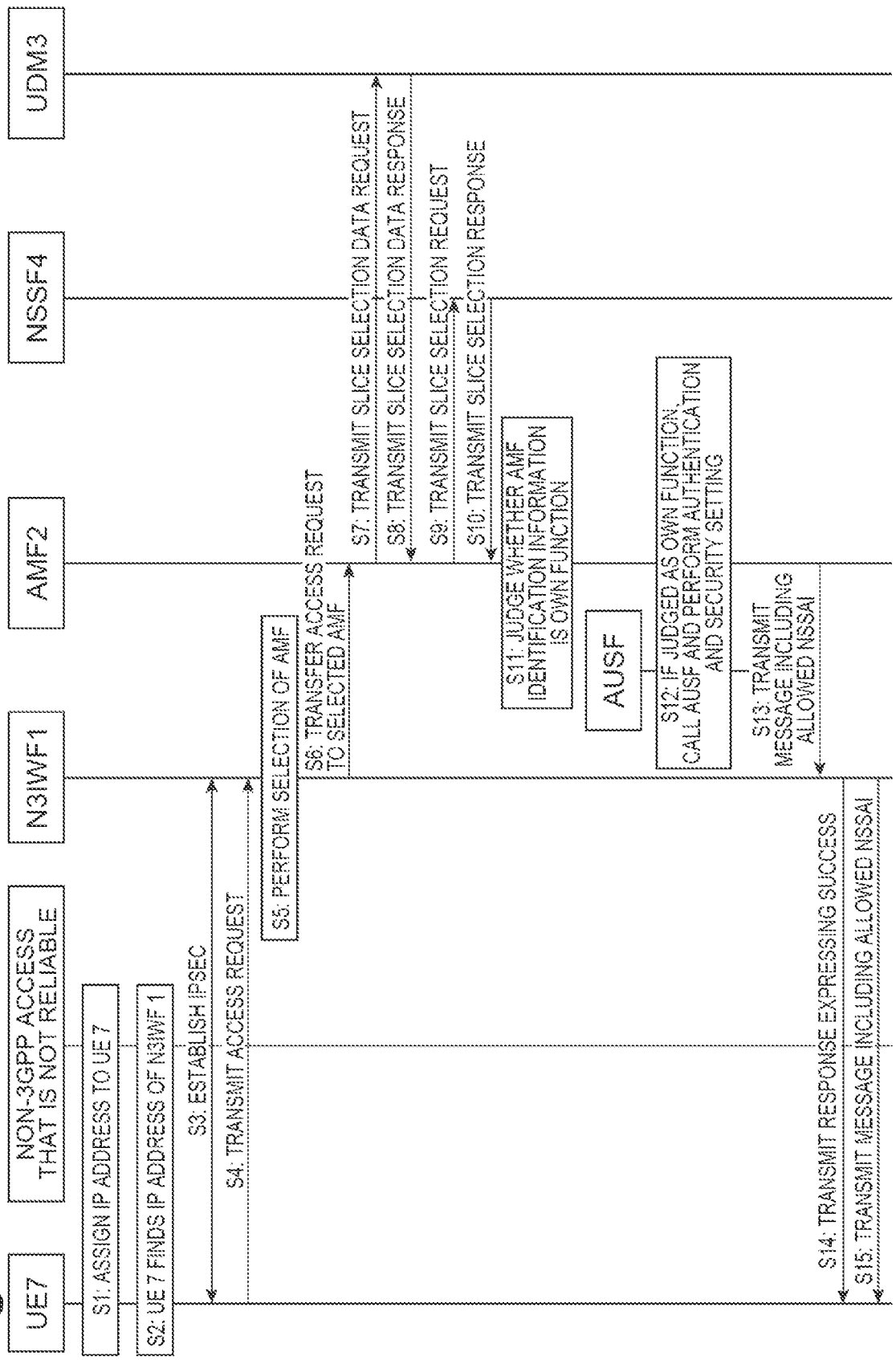
FIG. 10 is a sequence diagram that shows a process of a network access method according to the embodiment of the present invention.
Figure 11:
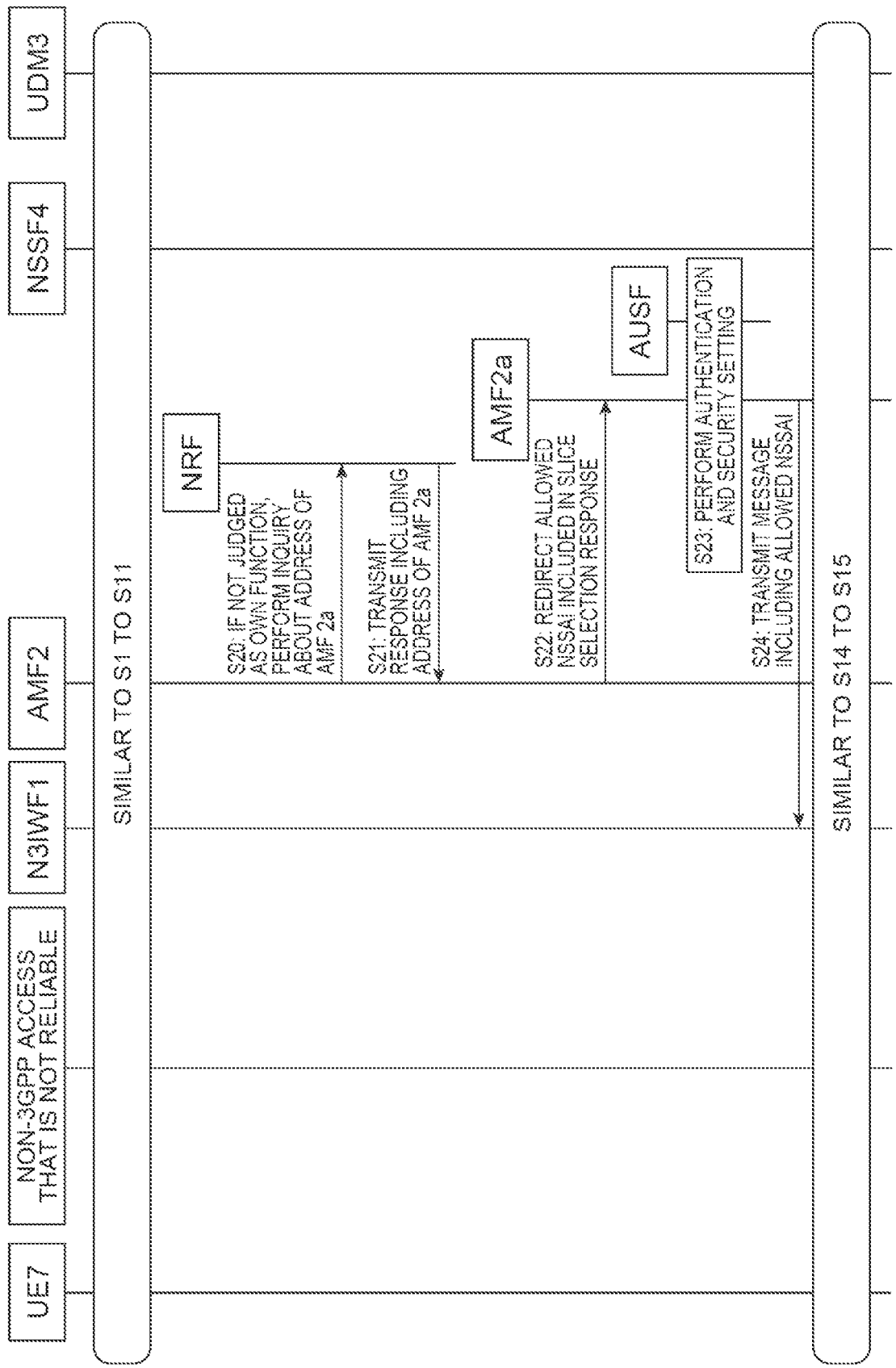
FIG. 11 is a sequence diagram that shows another process of the network access method according to the embodiment of the present invention.

Next, description is made of a process of the network access method according to the embodiment of the present invention with reference to sequence diagrams in FIG. 10 and FIG. 11. Note that the sequence diagram shown in FIG. 11 expresses a process in the case where the AMF 2 is not judged as the own function in S11 in the sequence diagram shown in FIG. 10.

In FIG. 10, first, when the UE 7 requests to access the slice 5, the UE 7 accesses the non-3GPP access that is not reliable, and an IP address is assigned to the UE 7 (step S1). Next, the UE 7 finds the IP address of the N3IWF 1 (by known technique) (step S2). Next, IPSec is established between the UE 7 and the N3IWF 1 (step S3). Next, the access request is transmitted from the UE 7 to the N3IWF 1 (step S4). For example, the access request is expressed by "IKE_AUTH request (AN-Param[Requested NSSAI, (S-NSSAI 190 1, SD #1)UE ID], NAS Registration request [Requested NSSAI, DNN #1])" or the like. Next, by the AMF selection unit 10 of the N3IWF 1, the selection of the AMF 2 is performed (step S5). Next, by the AMF selection unit 10 of the N3IWF 1, the access request is transferred to the AMF 2 that is selected in S5 (step S6). For example, the access request to be transferred is expressed by "N2 msg (NAS Reg. Req.[Requested NSSAI(S-NSSAI #1, SD #1), DNN #1], UE ID)" or the like.

Next, by the slice selection unit 20 of the AMF 2, the slice selection data request is transmitted to the UDM 3 (step S7). For example, the slice selection data request is expressed by "Slice Selection Data Req. (UE ID)" or the like. Next, by the slice selection unit 30 of the UDM 3, the slice selection data response is transmitted to the AMF 2 (step S8). For example, the slice selection data response is expressed by "Slice Selection Data Res. (Subscribed NSSAI)" or the like. Next, by the slice selection unit 20 of the AMF 2, the slice selection request is transmitted to the NSSF 4 (step S9). For example, the slice selection request is expressed by "Slice Selection Req. (Requested NSSAI, Subscribed NSSAI, UE location)" or the like. Next, by the slice selection unit 40 of the NSSF 4, the slice selection response is transmitted to the AMF 2 (step S10). The slice selection response is expressed by "Slice Selection Res. (Selected AMF Set or selected AMF list, Allowed NSSAI [NSI-ID])" or the like.

Next, by the slice selection unit 20 of the AMF 2, it is judged whether the AMF identification information included in the slice selection response is the own function (step S11). If the AMF identification information is judged as the own function in S11, the AUSF is called by the AMF 2, and the authentication of the UE 7 and the NAS security setting are performed (step S12). Next, by the slice selection unit 20 of the AMF 2, the message that includes the Allowed NSSAI is transmitted to the N3IWF 1 (step S13). For example, the message is expressed by "N2 msg (NAS Registration Accept [Allowed NSSAI])" or the like. Next, by the AMF selection unit 10 of the N3IWF 1, a response expressing that the access request has succeeded is transmitted to the UE 7 (step S14). For example, the response is expressed by "IKE_AUTH res. (success)" or the like. Next, by the AMF selection unit 10 of the N3IWF 1, the message that includes the Allowed NSSAI is transmitted to the UE 7 (step S15). For example, the message is expressed by "IPsec (NAS Registration Accept [Allowed NSSAI]" or the like.

As described above, FIG. 11 is the sequence diagram that expresses the process in the case where the AMF identification information is not judged as the own function in S11 in the sequence diagram shown in FIG. 10. In FIG. 11, first, the process similar to S1 to S11 in the sequence diagram shown in FIG. 10 is performed. Next, if the AMF identification information is not judged as the own function in S11, by the slice selection unit 20 of the AMF 2, the inquiry about the address of an AMF 2*a* that is identified by the AMF identification information included in the slice selection response is performed for the NRF (step S20). The inquiry is expressed by "NF Discovery Req. (NF Type (AMF), AMF Set and/or NSI-ID)" or the like. Next, by the NRF, the response that includes the address of the AMF 2*a* is transmitted to the AMF 2 (step S21). The response is expressed by "NF Discovery Res. (AMF2 address)" or the like. Next, by the slice selection unit 20 of the AMF 2, the Allowed NSSAI included in the slice selection response is redirected together to the AMF 2*a* (step S22). The redirect is expressed by "AMF redirect (Allowed NSSAI [NSI-ID])" or the like. Next, the AUSF is called by the AMF 2*a*, and the authentication of the UE 7 and the NAS security setting are performed (step S23). Next, by a slice selection unit 20*a* of the AMF 2*a*, the message that includes the Allowed NSSAI is transmitted to the N3IWF 1 (step S24). For example, the message is expressed by "N2 msg (NAS Registration Accept [Allowed NSSAI])" or the like. The following process similar to S14 and S15 in the sequence diagram shown in FIG. 10 is performed.

Note that the block diagram used in the description of the above embodiment expresses a block for each function unit. These function blocks (structural units) are achieved by an arbitrary combination of hardware and/or software. The achievement means of each function block is not limited particularly. That is to say, each function block may be achieved by one physically and/or logically coupled device, or may be achieved by a plurality of devices in a manner that two or more physically and/or logically separated devices are directly and/or indirectly connected (for example, with wire and/or without wire).

Figure 12:
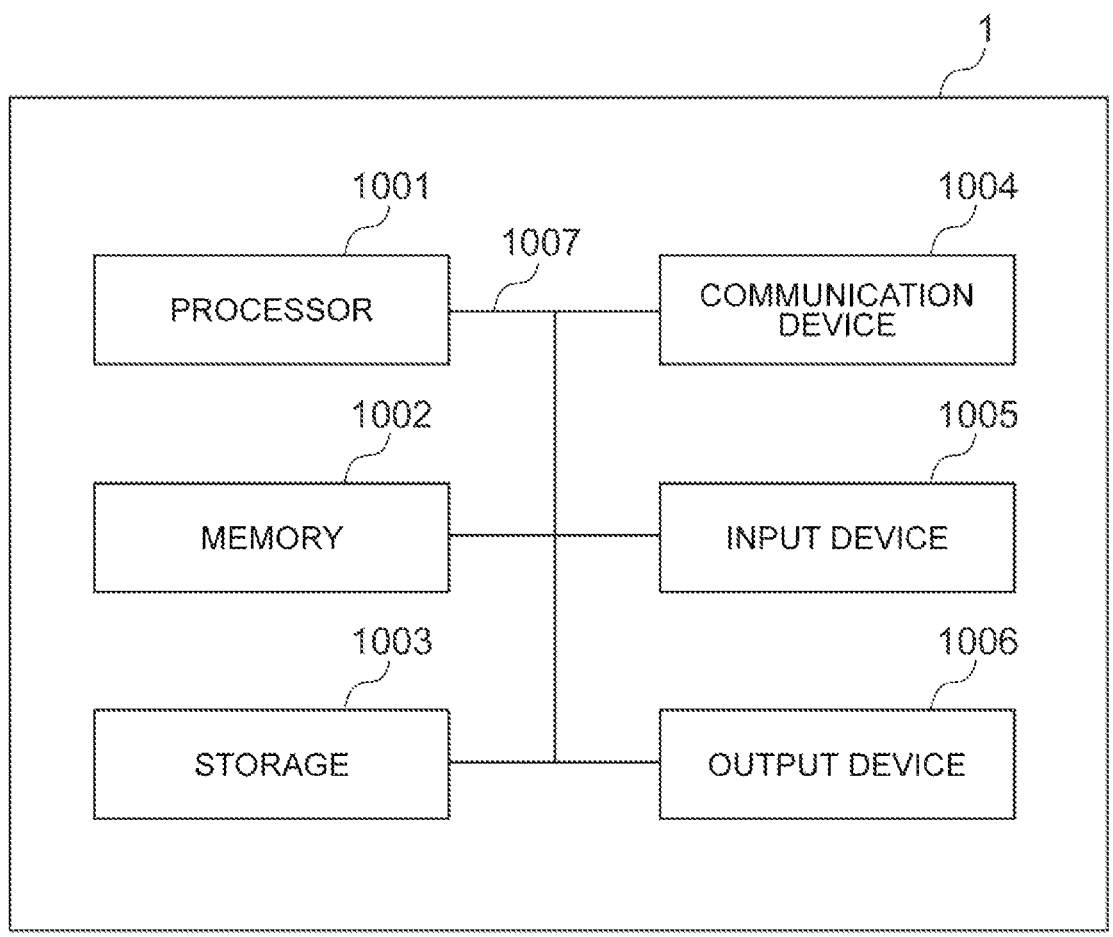
FIG. 12 is a hardware structure diagram of the N3IWF.

For example, the N3IWF 1 or the like according to one embodiment of the present invention may function as a computer that performs the process of the network access method according to the embodiment of the present invention. FIG. 12 is a diagram that illustrates one example of a hardware structure of the N3IWF 1 according to one embodiment of the present invention. The above N3IWF 1 may be physically formed as a computer device that includes a processor 1001, a memory 1002, a storage 1003, a communication device 1004, an input device 1005, an output device 1006, a bus 1007, and the like.

Note that in description blow, a term "device" can be read as a circuit, a device, a unit, or the like. The hardware structure of the N3IWF 1 may be formed by including one or a plurality of devices illustrated in the drawing, or may be formed by excluding a part of the devices.

Each function of the N3IWF 1 is achieved by causing the hardware such as the processor 1001 and the memory 1002 to read predetermined software (program) so that the processor 1001 performs calculation, and controlling communication of the communication device 1004, and reading and/or writing of data in the memory 1002 and the storage 1003.

The processor 1001 controls the entire computer by operating an operating system, for example. The processor 1001 may be formed by a central processing unit (CPU: Central Processing Unit) that includes an interface with a peripheral device, a control device, a calculation device, a register, and the like. For example, the above AMF selection unit 10 or the like may be achieved by the processor 1001.

The processor 1001 reads out the program (program code), a software module, and the data from the storage 1003 and/or the communication device 1004 to the memory 1002, and performs various processes accordingly. As the program, a program that causes the computer to perform at least a part of the operation described in the above embodiment is used. For example, the AMF selection unit 10 may be achieved by a control program that is stored in the memory 1002 and operates in the processor 1001, and another function block may be achieved similarly. It has been described that the various processes as above are performed by one processor 1001; however, the various processes may be performed by two or more processors 1001 concurrently or successively. The processor 1001 may be implemented by one or more chips. Note that the program may be transmitted from the network through an electric communication line.

The memory 1002 is a computer-readable recording medium and, for example, may be formed by at least one of a ROM (Read Only Memory), an EPROM (Erasable Programmable ROM), an EEPROM (Electrically Erasable Programmable ROM), a RAM (Random Access Memory), and the like. The memory 1002 may be referred to as a register, a cache, a main memory (main storage device), or the like. The memory 1002 can store the executable program (program code), the software module, or the like in order to perform the process of the network access method according to one embodiment of the present invention.

The storage 1003 is a computer-readable recording medium and, for example, may be formed by at least one of an optical disc such as a CD-ROM (Compact Disc ROM), a hard disk drive, a flexible disk, a magneto-optical disc (for example, compact disc, digital versatile disc, Blu-ray (registered trademark) disc), a smart card, a flash memory (for example, card, stick, key drive), a floppy (registered trademark) disk, a magnetic stripe, and the like. The storage 1003 may be referred to as an auxiliary storage device. The above recording medium may be, for example, a database, a server, or other appropriate medium that includes the memory 1002 and/or the storage 1003.

The communication device 1004 is hardware (transmission/reception device) for performing the communication between computers through a wired and/or wireless network, and, for example, is also referred to as a network device, a network controller, a network card, a communication module, or the like. For example, the AMF selection unit 10 or the like may be achieved by the communication device 1004.

The input device 1005 is an input device that accepts an input from the outside (for example, keyboard, mouse, microphone, switch, button, sensor, or the like). The output device 1006 is an output device that performs an output to the outside (for example, display, speaker, LED lamp, or the like). Note that the input device 1005 and the output device 1006 may be an integrated structure (for example, touch panel).

The devices such as the processor 1001 and the memory 1002 are connected to each other with the bus 1007 for communicating information. The bus 1007 may be formed by a single bus, or the devices may be connected with different buses.

The N3IWF 1 may be formed by including hardware such as a microprocessor, a digital signal processor (DSP: Digital Signal Processor), an ASIC (Application Specific Integrated Circuit), a PLD (Programmable Logic Device), and an FPGA (Field Programmable Gate Array). Each function block may be achieved by the hardware partially or entirely. For example, the processor 1001 may be implemented by at least one of these pieces of hardware.

Figure 13:
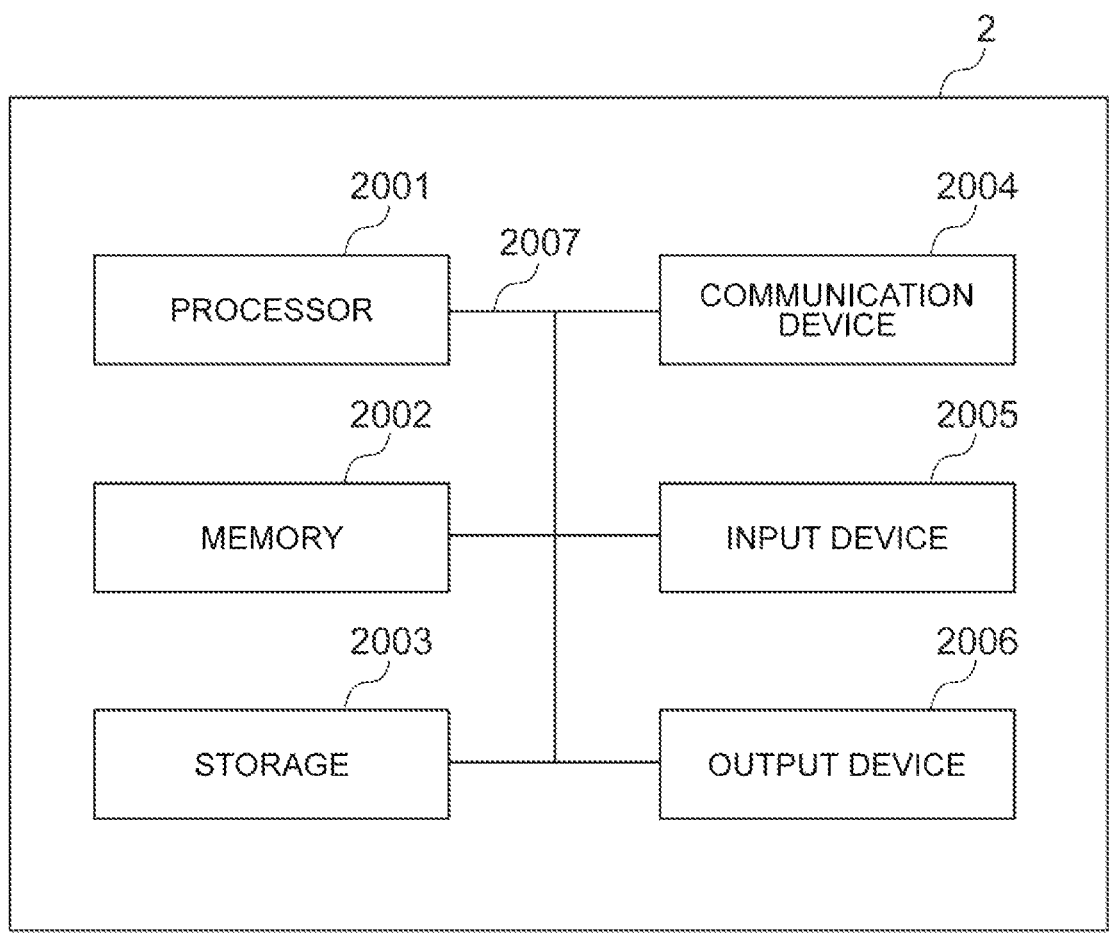
FIG. 13 is a hardware structure diagram of the AMF.

Moreover, for example, the AMF 2 or the like according to one embodiment of the present invention may function as a computer that performs the process of the network access method according to the embodiment of the present invention. FIG. 13 is a diagram that illustrates one example of a hardware structure of the AMF 2 according to one embodiment of the present invention. The above AMF 2 may be physically formed as a computer device that includes a processor 2001, a memory 2002, a storage 2003, a communication device 2004, an input device 2005, an output device 2006, a bus 2007, and the like.

Each function of the AMF 2 is achieved by causing the hardware such as the processor 2001 and the memory 2002 to read predetermined software so that the processor 2001 performs calculation, and controlling communication of the communication device 2004, and reading and/or writing of data in the memory 2002 and the storage 2003.

The processor 2001 controls the entire computer by operating an operating system, for example. The processor 2001 may be formed by a central processing unit that includes an interface with a peripheral device, a control device, a calculation device, a register, and the like. For example, the above slice selection unit 20 or the like may be achieved by the processor 2001.

The processor 2001 reads out the program, a software module, and the data from the storage 2003 and/or the communication device 2004 to the memory 2002, and performs various processes accordingly. As the program, a program that causes the computer to perform at least a part of the operation described in the above embodiment is used. For example, the slice selection unit 20 may be achieved by a control program that is stored in the memory 2002 and operates in the processor 2001, and another function block may be achieved similarly. It has been described that the various processes as above are performed by one processor 2001; however, the various processes may be performed by two or more processors 2001 concurrently or successively. The processor 2001 may be implemented by one or more chips. Note that the program may be transmitted from the network through an electric communication line.

The memory 2002 is a computer-readable recording medium and, for example, may be formed by at least one of a ROM, an EPROM, an EEPROM, a RAM, and the like. The memory 2002 may be referred to as a register, a cache, a main memory, or the like. The memory 2002 can store the executable program, the software module, or the like in order to perform the process of the network access method according to one embodiment of the present invention.

The storage 2003 is a computer-readable recording medium and, for example, may be formed by at least one of an optical disc such as a CD-ROM, a hard disk drive, a flexible disk, a magneto-optical disc, a smart card, a flash memory, a floppy disk, a magnetic stripe, and the like. The storage 2003 may be referred to as an auxiliary storage device. The above recording medium may be, for example, a database, a server, or other appropriate medium that includes the memory 2002 and/or the storage 2003.

The communication device 2004 is hardware for performing the communication between computers through a wired and/or wireless network, and, for example, is also referred to as a network device, a network controller, a network card, a communication module, or the like. For example, the slice selection unit 20 or the like may be achieved by the communication device 2004.

The input device 2005 is an input device that accepts an input from the outside. The output device 2006 is an output device that performs an output to the outside. Note that the input device 2005 and the output device 2006 may be an integrated structure.

The devices such as the processor 2001 and the memory 2002 are connected to each other with the bus 2007 for communicating information. The bus 2007 may be formed by a single bus, or the devices may be connected with different buses.

The AMF 2 may be formed by including hardware such as a microprocessor, a digital signal processor, an ASIC, a PLD, and an FPGA. Each function block may be achieved by the hardware partially or entirely. For example, the processor 2001 may be implemented by at least one of these pieces of hardware.

Figure 14:
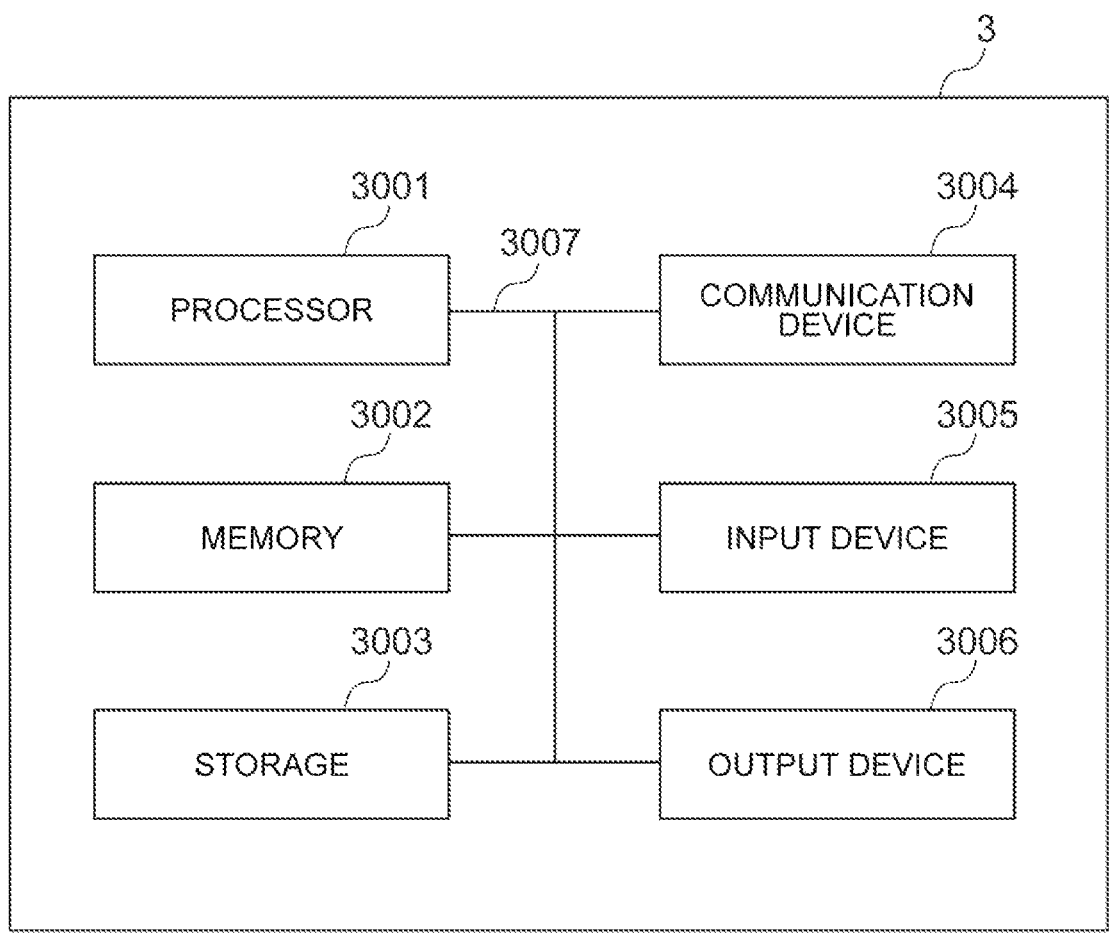
FIG. 14 is a hardware structure diagram of the UDM.

Moreover, for example, the UDM 3 or the like according to one embodiment of the present invention may function as a computer that performs the process of the network access method according to the embodiment of the present invention. FIG. 14 is a diagram that illustrates one example of a hardware structure of the UDM 3 according to one embodiment of the present invention. The above UDM 3 may be physically formed as a computer device that includes a processor 3001, a memory 3002, a storage 3003, a communication device 3004, an input device 3005, an output device 3006, a bus 3007, and the like.

Each function of the UDM 3 is achieved by causing the hardware such as the processor 3001 and the memory 3002 to read predetermined software so that the processor 3001 performs calculation, and controlling communication of the communication device 3004, and reading and/or writing of data in the memory 3002 and the storage 3003.

The processor 3001 controls the entire computer by operating an operating system, for example. The processor 3001 may be formed by a central processing unit that includes an interface with a peripheral device, a control device, a calculation device, a register, and the like. For example, the above slice selection unit 30 or the like may be achieved by the processor 3001.

The processor 3001 reads out the program, a software module, and the data from the storage 3003 and/or the communication device 3004 to the memory 3002, and performs various processes accordingly. As the program, a program that causes the computer to perform at least a part of the operation described in the above embodiment is used. For example, the slice selection unit 30 may be achieved by a control program that is stored in the memory 3002 and operates in the processor 3001, and another function block may be achieved similarly. It has been described that the various processes as above are performed by one processor 3001; however, the various processes may be performed by two or more processors 3001 concurrently or successively. The processor 3001 may be implemented by one or more chips. Note that the program may be transmitted from the network through the electric communication line.

The memory 3002 is a computer-readable recording medium and, for example, may be formed by at least one of a ROM, an EPROM, an EEPROM, a RAM, and the like. The memory 3002 may be referred to as a register, a cache, a main memory, or the like. The memory 3002 can store the executable program, the software module, or the like in order to perform the process of the network access method according to one embodiment of the present invention.

The storage 3003 is a computer-readable recording medium and, for example, may be formed by at least one of an optical disc such as a CD-ROM, a hard disk drive, a flexible disk, a magneto-optical disc, a smart card, a flash memory, a floppy disk, a magnetic stripe, and the like. The storage 3003 may be referred to as an auxiliary storage device. The above recording medium may be, for example, a database, a server, or other appropriate medium that includes the memory 3002 and/or the storage 3003.

The communication device 3004 is hardware for performing the communication between computers through a wired and/or wireless network, and, for example, is also referred to as a network device, a network controller, a network card, a communication module, or the like. For example, the slice selection unit 30 or the like may be achieved by the communication device 3004.

The input device 3005 is an input device that accepts the input from the outside. The output device 3006 is an output device that performs the output to the outside. Note that the input device 3005 and the output device 3006 may be an integrated structure.

The devices such as the processor 3001 and the memory 3002 are connected to each other with the bus 3007 for communicating information. The bus 3007 may be formed by a single bus, or the devices may be connected with different buses.

The UDM 3 may be formed by including hardware such as a microprocessor, a digital signal processor, an ASIC, a PLD, and an FPGA. Each function block may be achieved by the hardware partially or entirely. For example, the processor 3001 may be implemented by at least one of these pieces of hardware.

Figure 15:
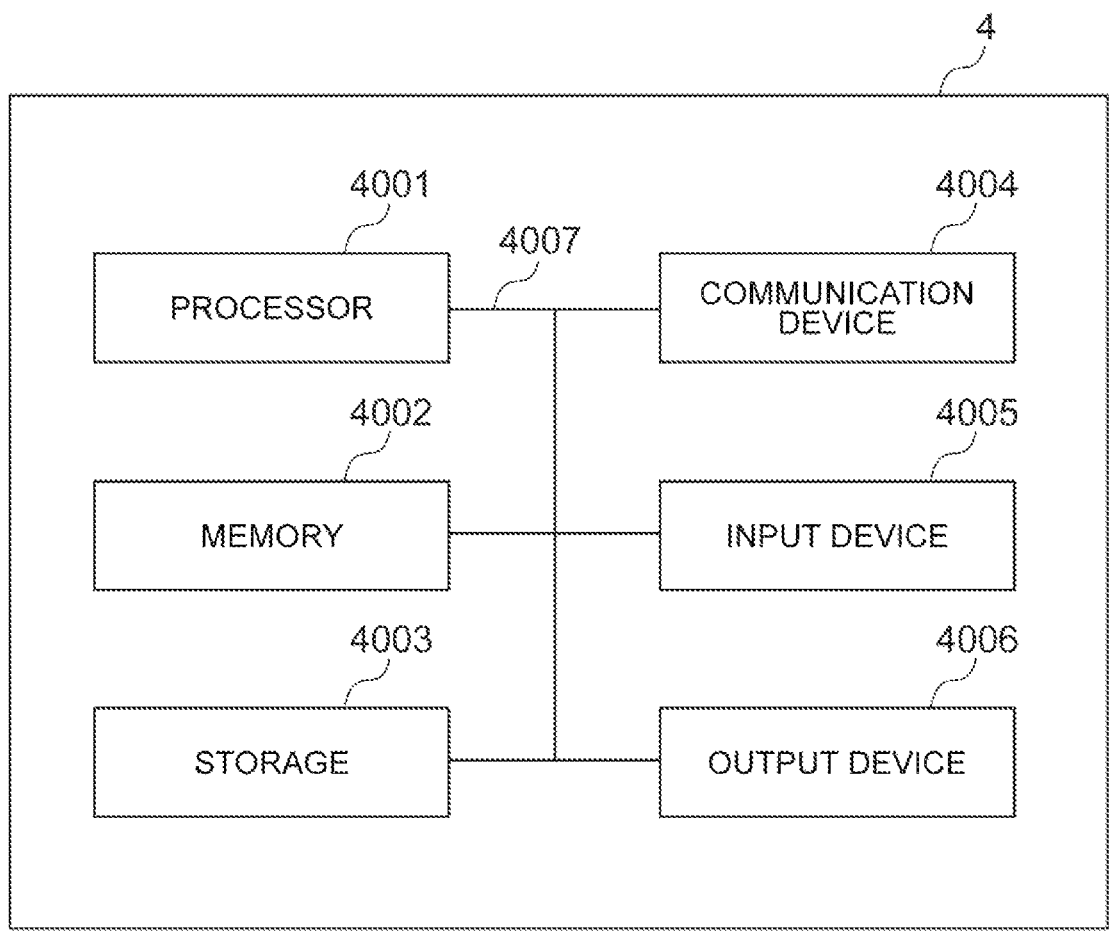
FIG. 15 is a hardware structure diagram of the NSSF.

Moreover, for example, the NSSF 4 or the like according to one embodiment of the present invention may function as a computer that performs the process of the network access method according to the embodiment of the present invention. FIG. 15 is a diagram that illustrates one example of a hardware structure of the NSSF 4 according to one embodiment of the present invention. The above NSSF 4 may be physically formed as a computer device that includes a processor 4001, a memory 4002, a storage 4003, a communication device 4004, an input device 4005, an output device 4006, a bus 4007, and the like.

Each function of the NSSF 4 is achieved by causing the hardware such as the processor 4001 and the memory 4002 to read predetermined software so that the processor 4001 performs calculation, and controlling communication of the communication device 4004, and reading and/or writing of data in the memory 4002 and the storage 4003.

The processor 4001 controls the entire computer by operating an operating system, for example. The processor 4001 may be formed by a central processing unit that includes an interface with a peripheral device, a control device, a calculation device, a register, and the like. For example, the above slice selection unit 40 or the like may be achieved by the processor 4001.

The processor 4001 reads out the program, a software module, and the data from the storage 4003 and/or the communication device 4004 to the memory 4002, and performs various processes accordingly. As the program, a program that causes the computer to perform at least a part of the operation described in the above embodiment is used. For example, the slice selection unit 40 may be achieved by a control program that is stored in the memory 4002 and operates in the processor 4001, and another function block may be achieved similarly. It has been described that the various processes as above are performed by one processor 4001; however, the various processes may be performed by two or more processors 4001 concurrently or successively. The processor 4001 may be implemented by one or more chips. Note that the program may be transmitted from the network through the electric communication line.

The memory 4002 is a computer-readable recording medium and, for example, may be formed by at least one of a ROM, an EPROM, an EEPROM, a RAM, and the like. The memory 4002 may be referred to as a register, a cache, a main memory, or the like. The memory 4002 can store the executable program, the software module, or the like in order to perform the process of the network access method according to one embodiment of the present invention.

The storage 4003 is a computer-readable recording medium and, for example, may be formed by at least one of an optical disc such as a CD-ROM, a hard disk drive, a flexible disk, a magneto-optical disc, a smart card, a flash memory, a floppy disk, a magnetic stripe, and the like. The storage 4003 may be referred to as an auxiliary storage device. The above recording medium may be, for example, a database, a server, or other appropriate medium that includes the memory 4002 and/or the storage 4003.

The communication device 4004 is hardware for performing the communication between computers through a wired and/or wireless network, and, for example, is also referred to as a network device, a network controller, a network card, a communication module, or the like. For example, the slice selection unit 40 or the like may be achieved by the communication device 4004.

The input device 4005 is an input device that accepts the input from the outside. The output device 4006 is an output device that performs the output to the outside. Note that the input device 4005 and the output device 4006 may be an integrated structure.

The devices such as the processor 4001 and the memory 4002 are connected to each other with the bus 4007 for communicating information. The bus 4007 may be formed by a single bus, or the devices may be connected with different buses.

The NSSF 4 may be formed by including hardware such as a microprocessor, a digital signal processor, an ASIC, a PLD, and an FPGA. Each function block may be achieved by the hardware partially or entirely. For example, the processor 4001 may be implemented by at least one of these pieces of hardware.

Next, an operation effect of the communication system 8 as structured in the present embodiment will be described.

By the network access method that is performed by the communication system 8 according to the present embodiment, in the mobile communication of the 5GC, the terminal identification information that identifies the UE 7 is acquired from the UE 7 that performs the non-cellular communication, the correspondence information correlating the UE 7 that performs the non-cellular communication and the slice 5 that provides the service is referred to, and the UE 7 that performs the non-cellular communication is caused to access the slice 5 that is correlated with the UE 7 that performs the non-cellular communication identified by the acquired terminal identification information. That is to say, in the mobile communication of the 5GC, the UE 7 that performs the non-cellular communication can access the slice 5 that provides the service.

Moreover, by the network access method that is performed by the communication system 8 according to the present embodiment, the UE 7 and the slice 5 that the UE 7 can use are correlated with each other in the correspondence information, the correspondence information is referred to, and the UE 7 is caused to access the slice 5 that the UE 7 identified by the terminal identification information acquired from the UE 7 can use. Thus, in the mobile communication of the 5GC, the UE 7 that performs the non-cellular communication can access the slice 5 that the UE 7 can use.

Moreover, by the network access method that is performed by the communication system 8 according to the present embodiment, the UE 7 and the slice 5 that the UE 7 can use on the basis of the current position are correlated with each other in the correspondence information, the correspondence information is referred to, and the UE 7 is caused to access the slice 5 that the UE 7 identified by the terminal identification information acquired from the UE 7 can use on the basis of the current position. Thus, in the mobile communication of the 5GC, the UE 7 that performs the non-cellular communication can access the slice 5 that the UE 7 can use on the basis of the current position.

Moreover, by the network access method that is performed by the communication system 8 according to the present embodiment, the UE 7 is caused to access the slice 5 further based on the slice 5 that is identified by the network identification information acquired from the UE 7. Thus, in the mobile communication of the 5GC, the UE 7 that performs the non-cellular communication can access the slice 5 that the UE 7 wants to access.

Moreover, by the network access method that is performed by the communication system 8 according to the present embodiment, each process is performed in the AMF 2 that manages the slice 5 identified by the network identification information that is acquired from the UE 7. Thus, the process is performed surely in the AMF 2 that manages the slice 5 that the UE 7 requests to access.

As described above, by the network access method that is performed by the communication system 8 according to the present embodiment, the UEs 7 that perform the access by a non-cellular wireless method (Trusted/Untrusted) are distributed to the plurality of appropriate slices by using the 5GC. Specifically, by creating a new interface that conventional technology does not have between the N3IWF 1 and the AMF 2, and correlating, in the AMF 2, the UDM 3, and the NSSF 4, the terminal identification information identifying the UE 7 for the UE 7 that performs the non-cellular communication that does not use a cellular method and the NSSAI that identifies the slice 5 to be accessed, even when the UE 7 that performs the non-cellular communication accesses the communication system 8 by using the non-cellular wireless method, the UE 7 can be caused to connect to the appropriate slice.

The present embodiment has been described in detail as above; however, it is clear for a person skilled in the art that the present embodiment is not limited to the embodiment described in the present specification. The present embodiment can be performed in modified and changed modes without departing from the concept and the range of the present invention determined by the description in the scope of claims. Thus, the description of the present specification is intended to describe the example, and does not have the meaning of limiting the present embodiment.

The notification of the information is not limited to the mode/embodiment described in the present specification, and may be performed by another method.

Each mode/embodiment described in the present specification may be applied to a system and/or a next-generation system that is expanded on the basis of the system that uses LTE (Long Term Evolution), LTE-A (LTE-Advanced), SUPER 3G, IMT-Advanced, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems.

In the process procedure, the sequence, the flowchart, or the like in each mode/embodiment described in the present specification, the order may be changed unless a contradiction occurs. For example, in the method described in the present specification, the elements in the various steps are expressed in the exemplary order, and are not limited to the particular order that is expressed.

The particular operation to be performed in a base station in the present specification may be performed in an upper node (upper node) thereof in some cases. In the network that includes one or a plurality of network nodes (network nodes) including the base station, it is clear that various operations that are performed for the communication with the terminal can be performed in the base station and/or another network node other than the base station (for example may be, but not limited to, MME, S-GW, or the like). In the above example, the case where the other network node other than the base station is one is expressed; however, a plurality of other network nodes (for example, MME and S-GW) may be combined.

The information or the like can be output from an upper layer (or lower layer) to the lower layer (or upper layer). The input and output can be performed through the plurality of network nodes.

The information or the like that is input or output may be stored in a particular area (for example, memory), or may be managed by a management table. The information or the like to be input or output can be overwritten, updated, or added. The information or the like that is output may be deleted. The information or the like that is input may be transmitted to another device.

The judging may be performed by a value expressed by one bit (0 or 1), may be performed by a Boolean value (Boolean: true or false), or may be performed by a numeric comparison (for example, comparison with predetermined value).

Each mode/embodiment described in the present specification may be used alone, may be used in combination, or may be used by switching in the execution. Moreover, the notification of the predetermined information (for example, notification of "that is X") is not limited to an explicit one, and may be performed implicitly (for example, notification of predetermined information is not performed).

The present invention has been described in detail as above; however, it is clear for a person skilled in the art that the present invention is not limited to the embodiment described in the present specification. The present invention can be performed in modified and changed modes without departing from the concept and the range of the present invention determined by the description in the scope of claims. Thus, the description of the present specification is intended to describe the example, and does not have the meaning of limiting the present invention.

Regardless of whether the software is referred to as software, firmware, middleware, microcode, or hardware description language or another name, the software should be widely interpreted as an instruction, an instruction set, a code, a code segment, a program code, a program, a sub-program, a software module, an application, a software application, a software package, a routine, a subroutine, an object, an executable file, an execution thread, a procedure, a function, or the like.

The software, the instruction, or the like may be transmitted/received through a transmission medium. For example, when the software is transmitted from a website, a server, or another remote source by using a wired technique such as a coaxial cable, an optical fiber cable, a twist pair, and a digital subscriber line (DSL) and/or a wireless technique such as infrared rays, wireless, and microwaves, these wired technique and/or wireless technique is included in the definition of the transmission medium.

The information, the signal, or the like described in the present specification may be expressed by using any one of various different techniques. For example, the data, the instruction, the command, the information, the signal, the bit, the symbol, the chip, or the like that is referred to throughout the above description may be expressed by voltage, current, electromagnetic waves, a magnetic field or a magnetic particle, an optical field or a photon, or an arbitrary combination thereof.

Note that the term described in the present specification and/or the term required for understanding the present specification may be replaced with a term having the same or similar meaning.

The terms "system" and "network" used in the present specification are used interchangeably.

Moreover, the information, the parameters, or the like described in the present specification may be expressed by an absolute value, may be expressed by a relative value from a predetermined value, or may be expressed by other corresponding information.

The name used in the above parameters is not limiting in any respect. Moreover, the expression or the like that uses these parameters may be different from that explicitly disclosed in the present specification.

The base station can contain one or a plurality of (for example, three) cells (also referred to as sector). In a case where the base station contains the plurality of cells, the entire coverage area of the base station can be sectioned into a plurality of smaller areas, and each smaller area can provide a communication service by a base station subsystem (for example, small size base station for indoor use RRH: Remote Radio Head). The term "cell" or "sector" indicates a part or all of the coverage area of the base station and/or the base station subsystem that performs the communication service in the coverage. Moreover, the terms "base station", "eNB", "cell", and "sector" can be used interchangeably in the present specification. The base station may be referred to as a term such as a fixed station (fixed station), NodeB, eNodeB (eNB), an access point (access point), a femtocell, or a small cell.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms by a person skilled in the art.

The terms "determining" and "determining" used in the present specification may incorporate various operations. "Determining" and "determining" may include deemed "determining" and "determining" of judging, calculating, computing, processing, deriving, investigating, looking up (for example, looking up in table, database, or another data structure), and ascertaining, for example. Moreover, "determining" and "determining" may include deemed "determining" and "determining" of receiving (for example, receiving information), transmitting (for example, transmitting information), input, output, and accessing (for example, accessing data in memory). Furthermore, "determining" and "determining" may include deemed "determining" and "determining" of resolving, selecting, choosing, establishing, comparing, or the like. That is to say, "determining" and "determining" may include deemed "determining" and "determining" of some operation.

The terms "connected" and "coupled", and every variation thereof mean any direct or indirect connection or coupling between two or more elements, and may include the existence of one or more intermediate elements between two elements that are "connected" or "coupled" to each other. The coupling and the connection between the elements may be physical, logical, or a combination thereof. In a case of the use in the present specification, two elements are considered to be "connected" or "coupled" to each other by using one or more electric wires, cables, and/or print electric connections, and by using electromagnetic energy such as electromagnetic energy including a wavelength in a wireless frequency region, a microwave region, and a light (both visible and invisible) region as examples that are non-limiting and non-inclusive.

The description "on the basis of" used in the present specification does not mean "on the basis of only" unless otherwise stated. In other words, the description "on the basis of" means both "on the basis of only" and "on the basis of at least".

Any reference to elements with a word such as "first" or "second" that is used in the present specification does not limit the number or order of these elements generally. These words can be used in the present specification as a convenient method to distinguish between two or more elements. Thus, the reference to first and second elements does not mean that only the two elements can be employed, or the first element should precede the second element in some manner.

As long as "including", "comprising", and variations thereof are used in the present specification or the scope of claims, these terms are intended to be inclusive as well as the term "including". Moreover, the term "or" used in the present specification or the scope of claims is intended to be not exclusive-OR.

Throughout the present disclosure, for example, in a case where an article is added in translation like a, an, and the in English, these articles include a plurality of things unless otherwise stated obviously in the context.

REFERENCE SIGNS LIST

1 N3IWF
2 AMF
3 UDM
4 NSSF
5/5a/5b slice
6/6a/6b DNN
7 UE
8 communication system
10 AMF selection unit
11 AMF information storing unit
20 slice selection unit
21 slice information storing unit
30 slice selection unit
31 terminal slice information storing unit
40 slice selection unit
41 position slice information storing unit

The invention claimed is:

1. A network access method to be performed by a communication system forming a core network of a cellular communication and to cause a communication terminal performing a non-cellular communication to access a service network providing a service, the network access method comprising:
   an acquisition step of acquiring, with a Non-3GPP Interworking Function (N3IWF), from the communication terminal, a request including terminal identification information identifying the communication terminal;
   a selection step of selecting, with the N3IWF, based on the acquired request, an Access and Mobility Management Function (AMF) corresponding to the service network; and
   an access step of referring, with the AMF, to correspondence information correlating the communication terminal and the service network, and causing the communication terminal to access the service network correlated with the communication terminal identified by the terminal identification information acquired in the acquisition step, wherein the correspondence information is stored in advance in the core network.

2. The network access method according to claim 1, wherein:

the correspondence information correlates the communication terminal and the service network the communication terminal can use; and the access step refers to the correspondence information, and causes the communication terminal to access the service network the communication terminal identified by the terminal identification information acquired in the acquisition step can use.

3. The network access method according to claim 2, wherein:

the acquisition step further acquires from the communication terminal, network identification information identifying the service network the communication terminal requests to access; and the access step causes the communication terminal to access the service network further based on the service network identified by the network identification information acquired in the acquisition step.

4. The network access method according to claim 2, wherein:

the communication system comprises a mobility management function managing mobility in the cellular communication; and the communication system acquires from the communication terminal, network identification information identifying the service network the communication terminal requests to access, selects the mobility management function managing the service network identified by the acquired network identification information, and performs the acquisition step and the access step in the selected mobility management function.

5. The network access method according to claim 1, wherein:

the correspondence information correlates the communication terminal and the service network the communication terminal can use on the basis of a current position; and the access step refers to the correspondence information, and causes the communication terminal to access the service network the communication terminal identified by the terminal identification information acquired in the acquisition step can use on the basis of the current position.

6. The network access method according to claim 5, wherein:

the acquisition step further acquires from the communication terminal, network identification information identifying the service network the communication terminal requests to access; and the access step causes the communication terminal to access the service network further based on the service network identified by the network identification information acquired in the acquisition step.

7. The network access method according to claim 5, wherein:

the communication system comprises a mobility management function managing mobility in the cellular communication; and the communication system acquires from the communication terminal, network identification information identifying the service network the communication terminal requests to access, selects the mobility management function managing the service network identified by the acquired network identification information, and performs the acquisition step and the access step in the selected mobility management function.

8. The network access method according to claim 1, wherein:

the acquisition step further acquires from the communication terminal, network identification information identifying the service network the communication terminal requests to access; and the access step causes the communication terminal to access the service network further based on the service network identified by the network identification information acquired in the acquisition step.

9. The network access method according to claim 8, wherein:

the communication system comprises a mobility management function managing mobility in the cellular communication; and the communication system acquires from the communication terminal, network identification information identifying the service network the communication terminal requests to access, selects the mobility management function managing the service network identified by the acquired network identification information, and performs the acquisition step and the access step in the selected mobility management function.

10. The network access method according to claim 1, wherein:

the communication system comprises a mobility management function managing mobility in the cellular communication; and the communication system acquires from the communication terminal, network identification information identifying the service network the communication terminal requests to access, selects the mobility management function managing the service network identified by the acquired network identification information, and performs the acquisition step and the access step in the selected mobility management function.

11. A communication system forming a core network of a cellular communication, and causing a communication terminal performing a non-cellular communication to access a service network providing a service, the communication system comprising a circuitry configured to:

acquire, with a Non-3GPP Interworking Function (N3IWF), from the communication terminal, a request including terminal identification information identifying the communication terminal;

select, with the N3IWF, based on the acquired request, an Access and Mobility Management Function (AMF) corresponding to the service network; and refer, with the AMF, to correspondence information correlating the terminal identification information and the service network, and cause the communication terminal identified by the terminal identification information to access the service network correlated with the acquired terminal identification information, wherein the correspondence information is stored in advance in the core network.

* * * * *